US006542978B2

(12) United States Patent
Goldstein et al.

(10) Patent No.: US 6,542,978 B2
(45) Date of Patent: *Apr. 1, 2003

(54) EXTERNALLY IDENTIFIABLE DESCRIPTOR FOR STANDARD MEMORY ALLOCATION INTERFACE

(75) Inventors: Richard Goldstein, Sunnyvale, CA (US); David Zittin, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/740,740

(22) Filed: Dec. 18, 2000

(65) Prior Publication Data

US 2001/0039607 A1 Nov. 8, 2001

Related U.S. Application Data

(63) Continuation of application No. 08/667,839, filed on Jun. 20, 1996, now Pat. No. 6,247,105.

(51) Int. Cl.[7] .............................................. G06F 12/00
(52) U.S. Cl. ....................................... 711/170; 711/209
(58) Field of Search .................. 711/170–173, 200–209

(56) References Cited

U.S. PATENT DOCUMENTS

| 4,695,949 A | * | 9/1987 | Thatt et al. .................. 707/206 |
| 5,101,485 A | * | 3/1992 | Perazzoli, Jr. ............... 711/206 |
| 5,572,672 A | * | 11/1996 | DeWitt et al. ................ 714/47 |
| 5,613,105 A | * | 3/1997 | Zbikowski et al. .......... 707/100 |
| 5,680,582 A | * | 10/1997 | Slayden ....................... 711/171 |

OTHER PUBLICATIONS

Richter, Jeffrey, "Advanced Windows NT", Microsoft Press, pp. 106–139.*
Lamie, Bill, Chasing Down Memory Bugs, Embedded Systems Programming, p. (13), Apr. 1996.*
Goodman, Kevin J., "Windows NT: A Developer's Guide" Chapter 9, "Memory APIs" pp(11).*
Pietrek, Matt, "Under the Hood" Microsoft Systems Journal, pp(13).*
DelRossi, Robert, "BoundsChecker Pro 3.01 and HeapAgent 2.02", Software Development, pp(6).*
Pietrek, An Exclusive Tour of the New ToolHelp32 Functions for Windows 95, Microsoft Systems Journal, p. (31), Sep. 1995.*

* cited by examiner

Primary Examiner—St. John Courtenay, III
(74) Attorney, Agent, or Firm—J. D. Harriman, II, Esq.; Coudert Brothers LLP (57) ABSTRACT

The invention noninvasively provides information relating to memory space allocation. Memory space allocation information is maintained in a location that is known or identifiable outside of the process for which the memory space has, been allocated. A memory space allocator maintains the information in a descriptor block. The descriptor block is updated with every allocation or deallocation of memory space. In the preferred embodiment of the invention, the descriptor block exists on a page of memory having a size equal to the native page size of the machine on which it is, operating. The memory allocator allocates memory space in units referred to as buckets that exist within a memory block. The descriptor block contains an identifier that identifies the memory space allocation information stored in that descriptor block as being controlled by a particular memory space allocator. The descriptor block also contains information that indicates how many pages are used and how many pages are free.

11 Claims, 4 Drawing Sheets

EXTERNALLY IDENTIFIABLE DESCRIPTOR FOR STANDARD MEMORY ALLOCATION INTERFACE

This is a continuation of application Ser. No. 08/667,839, filed Jun. 20, 1996 now U.S. Pat. No. 6,247,105.

BACKGROUND OF THE INVENTION

1. Field of the Invention

The invention relates to a method and apparatus for information processing, particularly to a memory allocation system.

2. Background Art

In the prior art, information relating to memory allocation is not stored in a manner that allows it to be examined by processes external to the allocator. The ability to examine this information is desirable since an understanding of the overall configuration of allocated memory space and free memory space is useful for evaluating and optimizing performance of a computer system especially when concerned with applications that exist for long periods of time (e.g. greater than five minutes). Desktop applications often exist for periods of time measured in months. To examine how memory is being allocated for particular code in the prior art, it is necessary to modify that code before it is executed. Thus, the code being executed is not identical to the code for which the information relating to memory allocation is sought.

Prior Art Techniques

Computers are used to process information. Computers execute programs that specify steps to be used to process the information. A computer operating system controls execution of the programs. Some computer operating systems allow multiple programs to be executed concurrently. In such operating systems, multiple processes are established that allow execution of the multiple programs. The operating system allocates the processing time of a processor to the processes. Program information and data processed by the programs are stored in memory devices of the computer. When the execution of a program begins, memory space in the memory devices is allocated to the corresponding process. If an inadequate amount of memory space is allocated to a process, the process may encounter a fatal out-of-space condition when running. When the execution of a program ends, the memory space allocated to the process is freed to allow the memory space to be reused.

Techniques are needed to allocate memory space to a process and to free or deallocate the memory space after the process no longer needs it. In the past, in the C programming language, standardized C library routines were provided to allow memory space to be allocated and freed. The standard C library routine to allocate memory space is referred to as the "malloc" function. The standard C library routine to free memory space if referred to as the "free" function.

The "malloc" function is executed with a parameter specifying the size of the memory block to be allocated. The "malloc" function finds a block of memory space of adequate size and returns a pointer to the beginning of the memory block.

The "free" function is executed with a parameter specifying a pointer pointing to a memory block previously allocated by the "malloc" function. The "free" function frees the specified memory block to be used again by the same process.

The "malloc" function maintains multiple lists of free blocks according to size and allocates space from the appropriate list. If "malloc" is unable to locate an unallocated memory block of sufficient size, it invokes an "sbrk-"function to have the operating system provide more memory space from which allocations may be made.

If it is desired to change the size of a memory block that has already been allocated, the "realloc" function may be invoked. The "realloc" function is executed with a parameter specifying the pointer that points to a memory block that has already been allocated and another parameter specifying the new size desired for that memory block. The "realloc" function allocates a memory block of sufficient size and returns a pointer to the new memory block. The pointer may point to a memory block having the same beginning location as the memory block that existed at the time the "realloc" function was called, or the pointer may point to a memory block having a different beginning location if inadequate memory space existed in the memory block previously allocated and free memory space contiguous with that memory block.

While the "malloc" and "free" functions are adequate for obtaining and freeing blocks of memory, they do not provide the ability to examine the current status of free and allocated memory space. This ability is desirable since an understanding of the overall configuration of allocated memory space and free memory space would be useful for evaluating and optimizing performance of a computer system, especially in long-lived processes. In particular, it would be useful to be able to specify a process and be provided with information indicating the blocks of memory space allocated to the process and their locations in the overall memory space of the computer system.

In the past, a program could be rewritten to include calls to a "mallinfo" function. The "mallinfo" function provides information describing memory space allocation. Typical information provided by the "mallinfo" function includes the total space in the arena, the number of ordinary blocks, the number of small blocks, the number of holding blocks, the space in holding block headers, the space in small blocks in use, the space in free small blocks, the space in ordinary blocks in use, the space in free ordinary blocks, cost of enabling the keep option, the maximum size of small blocks, the number of small blocks in a holding block, the small block rounding factor, the space (including overhead) allocated in ordinary blocks, the number of ordinary blocks allocated, and the number of bytes used in maintaining the free tree. While this information is useful for analyzing performance, the calls to the "mallinfo" function must be added to the program being analyzed. Thus, use of the "mallinfo" function is an invasive procedure that does not permit analysis of a program in the form in which the program is intended to be used.

The inclusion of the "mallinfo" function adds complexity to the code which increases development and maintenance costs. Further, the memory space allocation information associated with a process that includes the "mallinfo" functionality may be skewed by the inclusion of the "mallinfo" function. That is, the "mallinfo" functionality may alter the memory allocation information. This alteration may result in difficulty in making a memory allocation assessment by an application developer.

To include the "mallinfo" functionality in a process executing code that does not include this functionality, it is necessary to terminate the process and initiate a new process executing code that contains calls to the "mallinfo" function. Thus, it is cumbersome to add this functionality to code that is already executing.

SUMMARY OF THE INVENTION

The invention provides a method and apparatus for non-invasively providing information relating to memory space allocation. The invention allows memory space allocation to be examined by processes external to the memory space allocator without the need to modify the code for processes to which memory space is being allocated.

An embodiment of the invention provides a method and apparatus for maintaining memory allocation information comprising the steps of reserving a memory space arena, defining a data structure to store the memory allocation information, and storing the memory allocation information.

The memory allocation information comprises a first value representative of a quantity of pages of a first bucket size instantiated in the memory space arena. The memory allocation information also comprises a second value representative of a quantity of buckets allocated in one of the quantity of pages of the first bucket size instantiated in the memory space arena. The memory allocation information further comprises a pointer to a linked list identifying unallocated buckets in one of the quantity of pages of the first bucket size.instantiated in the memory space arena.

One embodiment of the invention also provides a method and apparatus to modify the memory allocation information when a change in memory allocation occurs. The invention allows the memory allocation information to be modified appropriately when memory is allocated and when memory is freed.

An embodiment of the invention provides a method and apparatus to identify the data structure by storing a data structure identifier in the data structure. The data structure identifier is preferably a known or readily identified value stored in a known or readily identified memory location within the data structure. The memory location at which the data structure identifier is stored is intentionally made known to external programs, thereby allowing the external programs to know where to look for the data structure identifier and to know what to look for at that memory location so as to identify the data structure.

DETAILED DESCRIPTION OF THE INVENTION

A method and apparatus for allocating memory in a computer system and for providing information relating to memory allocation is described. In the following description, numerous specific details, such as bucket sizes, page sizes, descriptor block formats, and computing environments are set forth in order to provide a more thorough understanding of the invention. It will be apparent, however, to one skilled in the art, that the invention may be practiced without these specific details. In other instances, well-known features have not been described in detail in order not to unnecessarily obscure the invention.

In the prior art, information relating to memory allocation is not stored in a manner that allows it to be examined by processes external to the allocator. To examine how memory is being allocated for particular code, it is necessary to modify that code before it is executed. Thus, the code being executed is not identical to the code for which the information relating to memory allocation is sought.

The invention avoids the problems of the prior art by providing information relating to memory allocation that external processes may easily and noninvasively obtain. The invention may be used to examine memory that has been allocated for code that has not been altered in any way. Thus, the invention serves a useful purpose of analyzing memory use in processes that have been executing for long periods of time, for example, even weeks or months, before the analysis of memory allocation is to be performed.

The invention provides a method and apparatus for noninvasively providing information relating to memory space allocation. The invention avoids the need to modify programs to cause information relating to memory space allocation to be provided. Thus, the invention allows the memory space allocation for a given program to be analyzed using the program in the form in which the program is intended to be used. The invention also avoids the need to alter the processes by which a program is executed.

An embodiment of the invention provides information relating to memory space allocation by maintaining such information in a location that is known or identifiable outside of the process for which the memory space has been allocated. A memory space allocator maintains the information in a data structure and updates the data structure with every allocation or deallocation of memory space. Thus, the memory space allocator assures that the information in the data structure represents the current state of the memory space.

In the preferred embodiment of the invention, the data structure containing memory space allocation information maintained by the memory space allocator exists on a page of memory referred to as the descriptor block. The memory space allocator has control over an area of memory referred to as an arena. The process requests that the operating system kernel reserves the memory area occupied by the arena for exclusive use of the memory space allocator and prevents other processes from using or modifying this memory area.

A bucket is a unit of memory space that can be allocated by the memory allocator. Buckets may be of a variety of types, for example, small buckets, medium buckets, large buckets, and extra large buckets. The small buckets provide eight bytes of information that may be allocated. The medium buckets provide 16 bytes of information that may be allocated. The large buckets provide 24 bytes of information that may be allocated. The extra large buckets provide 32 bytes of information that may be allocated. These bucket sizes are given as examples, and it is understood that other bucket sizes and numbers of different bucket sizes are possible according to the invention. The descriptor block contains an identifier that identifies the memory space allocation information stored in that descriptor block as being controlled by a particular memory space allocator. The descriptor block also contains information that indicates how many buckets are used, how many buckets are free, and how much memory space is currently available as a contiguous block.

An external utility program may determine memory space allocation Information by reading the information stored in the descriptor block. Since the location of the memory space arena is known by the operating system kernel, the external utility program may easily locate the descriptor block by looking for the identifier stored in the descriptor block and read the descriptor block without having to interfere with the operation of the memory space allocator or the processes to which memory space has been allocated by the memory space allocator. Thus, the invention overcomes the disadvantages of the prior art.

Figure 1:
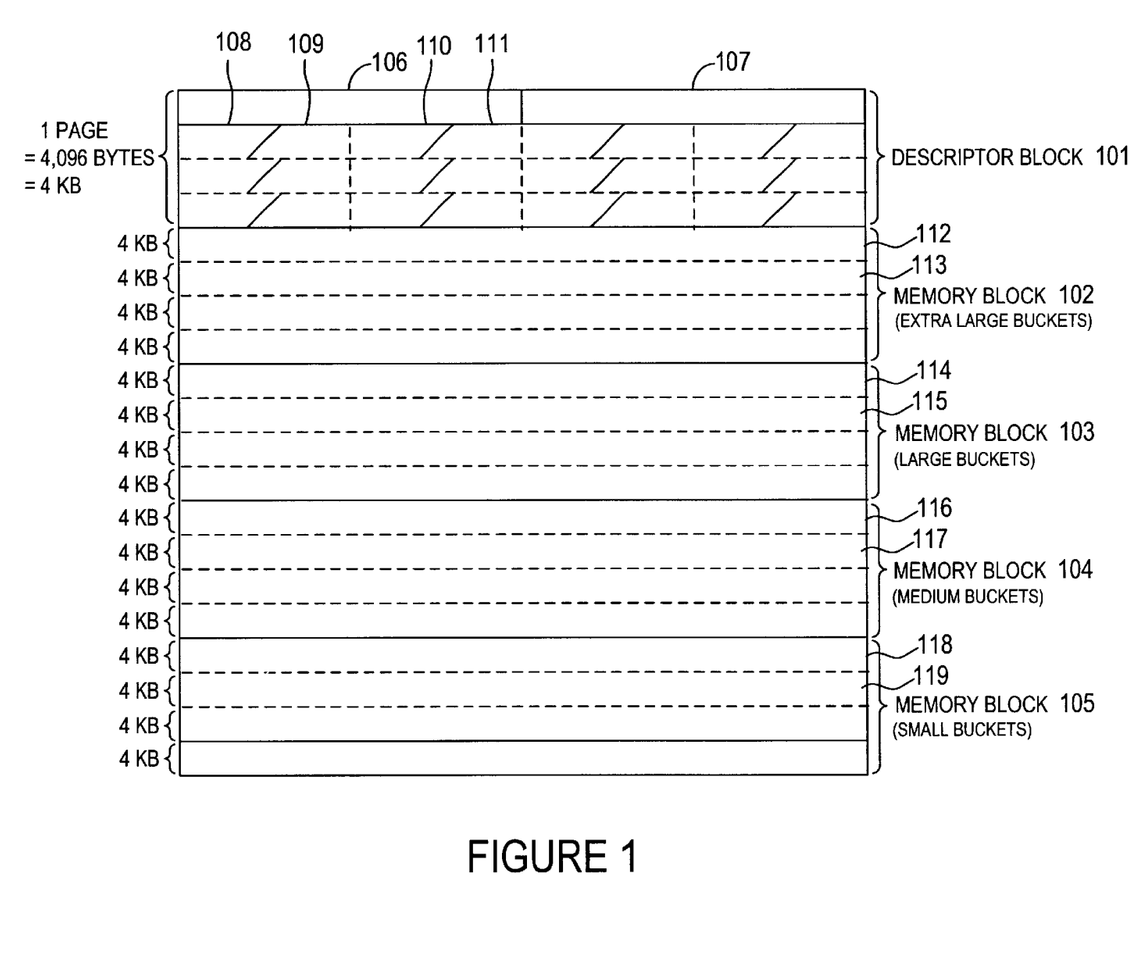
FIG. 1 is a diagram illustrating an example of a memory space arena according to one embodiment of the invention on a machine with a four kilobyte page size.

FIG. 1 is a diagram illustrating an example of a memory space arena according to one embodiment of the invention. The memory space arena comprises memory space reserved by the operating system for use by a memory allocator. The operating system allows the memory allocator to use the memory space arena while prohibiting other processes from interfering with the memory space arena.

The memory space arena comprises descriptor block 101 and a number of memory blocks. Each memory block comprises a number of memory pages. As an example, a memory page may include 4096 bytes. Each memory page comprises a number of buckets. A bucket comprises a unit of memory space that may be allocated.

The memory blocks may differ from each other in the size of the buckets they contain. For example, memory block 102 comprises extra large buckets, each bucket preferably having a size of 32 bytes. Memory block 103 comprises large buckets, each bucket preferably having a size of 24 bytes. Memory block 104 comprises medium buckets, each bucket preferably having a size of 16 bytes. Memory block 105 comprises small buckets, each bucket preferably having a size of 8 bytes. The memory allocator selects the optimum bucket sizes determined empirically in an a priori manner to allocate for each process to which it allocates memory space.

Descriptor block 101 is preferably contained on a single page and comprises memory allocation information. In the preferred embodiment of the invention, descriptor block 101 exists on a page of memory having a size equal to the native page size of the machine on which it is operating. For example, descriptor block 101 preferably has a size of 4096 bytes if on a machine with a native page size of 4096 bytes. The memory allocation information includes information as to the number of different types of memory blocks that have been defined within the memory space arena, the sizes of the buckets within each memory block, and the number of memory pages that have been instantated within each memory block. This information is preferably stored at memory location 107. Memory location 107 may be located anywhere in descriptor block 101.

When a memory page is instantiated, it is preferably mapped as a page in the virtual memory system with backup store capability to allow the memory page to be swapped into or out of the system memory by the system. When a memory page is swapped out of the system memory, it is stored on a mass storage device. When a memory page is swapped into the system memory, it is stored in the system random access memory.

The memory allocation information contained in descriptor block 101 also includes information indicating, for each memory page in each memory block, how many buckets have been allocated by the memory allocator and how many buckets remain free to be allocated by the memory allocator. The former information is referred to as the allocated bucket count for each memory page and the latter information is referred to as the free bucket count for each memory page.

The memory allocation information contained in descriptor block 101 also includes, for each memory page in each memory block, a pointer to the head of a linked list that identifies the free buckets in the memory page. The free buckets are the allocatable units of memory in the memory page that are not allocated by the memory allocator. The link data is stored within each allocatable bucket.

Memory locations 108 and 109 illustrate an example of a bucket count and linked list pointer pair for a given memory page, for example, memory page 112 within memory block 102. An allocated bucket count and/or a free bucket count is stored in memory location 108. A pointer to a linked list of free buckets is stored in memory location 109.

Memory locations 110 and 111 illustrate an example of a bucket count and linked list pointer pair for another memory page, for example, memory page 113 within memory block 102. An allocated bucket count and/or a free bucket count is stored in memory location 110. A pointer to a linked list of free buckets is stored in memory location 111.

Such bucket count and linked list pointer pairs exist in descriptor block 101 for each memory page within each memory block in the memory space arena. For example, other bucket count and linked list pointer pairs exist in descriptor block 101 for memory pages 114 and 115 within memory block 103, for memory pages 116 and 117 within memory block 104, and for memory pages 118 and 119 within memory block 105.

Descriptor block 101 also contains data structure identifier 106. Data structure identifier 106 comprises a known or readily identified value or pattern stored at a known or readily identified location within descriptor block 101 The data structure identifier aids in the location of the memory space arena, especially the descriptor block. The data structure identifier allows a process external to the memory allocator to search memory space by checking the specified location on each memory page for the presence of the specified value or pattern to locate a descriptor block.

TABLE 1

```
#ifndef __FLYWEIGHT_ALLOCATOR_H
#define __FLYWEIGHT_ALLOCATOR_H
#pragma ident "@(#)flyalloc.h 1.5 95/12/21 SMI"
/*
 * The flyweight allocator is a malloc/realloc/free interposer
 * which is tailored to the way CDE uses memory. CDE tends to
 * allocate very large numbers of very small blocks -- the vast
 * majority being 32 bytes and under.
 */
/* Hex representation of the name "flyalloc" 8^|
 * Has the advantage that in a dump of the raw data
 * for a segment, "flyalloc" as the first 8 bytes is
 * easily identifiable.
 */
enum {
    FLYMAGIC1 = 0x666c7961,
    FLYMAGIC2 = 0x6c6c6f63
};
/* Arena size in pages plus 1 for the header information */
enum { NBLOCKS = 400 + 1};
/* Number of bucket sizes */
enum { NSIZES = 4 };
enum {
    HGEBUCKETSIZE = 32, /* Divides evenly into BLOCKSIZE */
    LRGBUCKETSIZE = 24, /* Tiny bit of tail waste */
    MEDBUCKETSIZE = 16, /* Divides evenly into BLOCKSIZE */
    WEEBUCKETSIZE = 8 /* Divides evenly into BLOCKSIZE */
};
enum {
    HGEBUCKET,
    LRGBUCKET,
    MEDBUCKET,
    WEEBUCKET
};
typedef struct __BucketRec* BucketListPtr; /* Used for free list */
struct __BucketRec {
    struct __BucketRec* next,
};
```

TABLE 1-continued

```
/* Flag set in page[n].count if physical page hasn't been allocated yet. */
static const unsigned short UNALLOCED = (unsigned short)-1;
typedef struct {
    BucketListPtr    freelist;    /* first free slots */
    unsigned short   count;       /* number of free slots */
} PageDescriptor;
typedef struct _BucketDescriptorRec BucketDescriptor;
struct _BucketDescriptorRec {
    unsigned char*   endAddress;
    unsigned char*   startAddress;
    unsigned char*   nextblock;
    PageDescriptor*  hotpage;
    unsigned short   bucketsize;
    /* Pre-computed values used by external client */
    unsigned short   offset; /* PageDescriptor start index */
    unsigned short   count; /* # of pages at this bucket size */
};
/* The main block where all the mapping and page info is
 * tracked. It is intended that this block be identifiable
 * and readable by an external agent to report on allocation
 * statistics.
 */
typedef struct {
    unsigned int     magic1;      /* id ourselves */
    unsigned int     magic2;
    unsigned short   pagesize;    /* need this, ULTRASparc uses 8k */
    /* Bucket information, only the count, offset & bucketsize
     * values are useful for an external reader.
     */
    BucketDescriptor buckets[NSIZES];
    /* Used as a quick way to map a bucket size to its
     * corresponding BucketDescriptor. Ordering is dependent
     * upon the initialization sequence in init_bucket_descriptors( ).
     */
    BucketDescriptor* bucket_map[HGEBUCKETSIZE+1];
    PageDescriptor   pages[NBLOCKS-1];  /* the actual page handles */
} AreaDescriptor;
#endif /* _FLYWEIGHT_ALLOCATOR_H */
```

Table 1 provides a data structure definition in the C programming language as an example of one embodiment for implementing the invention. The specific values that appear in Table 1 are intended to serve as examples, and it is understood that the invention is not limited to these values or to a specific range of values. Moreover, the invention is not limited to being implemented using the C programming language, but it may be implemented using other programming languages or environments.

Figure 2:
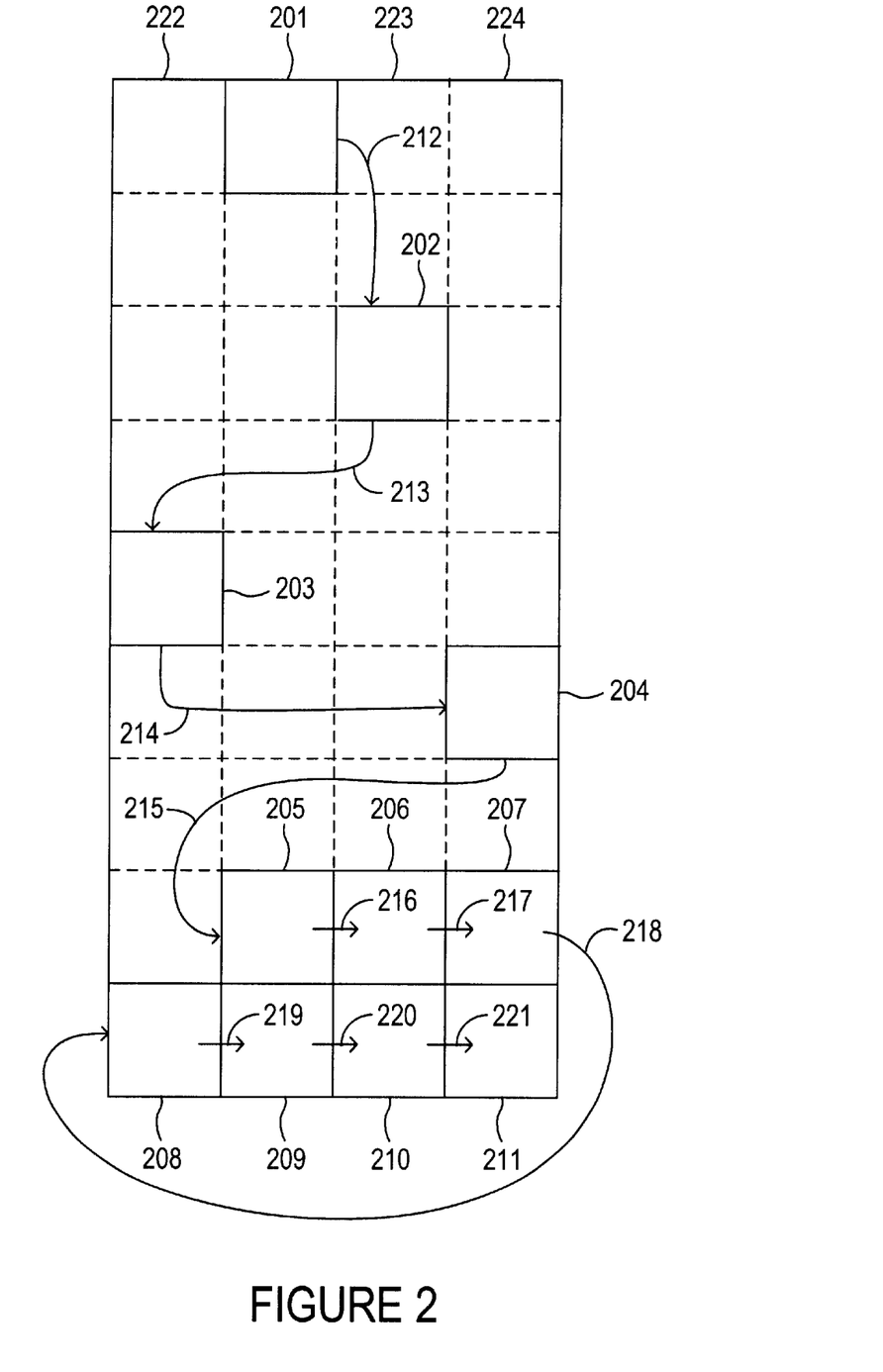
FIG. 2 is a diagram illustrating an example of a memory page according to one embodiment of the invention.

FIG. 2 is a diagram illustrating an example of a memory page according to one embodiment of the invention. The memory page is divided into buckets. Examples of such buckets are buckets 222, 223, and 224. If the page size and bucket size are such that the page size is divisible into an integer number of buckets, all of the memory space in the memory page is divided into buckets. If the page does not provide an integer number of buckets, a small amount of extra unusable memory space may exist on the page.

On any given memory page; all of the buckets may be free, all of the buckets may be allocated, or some of the buckets may be free and some of the buckets may be allocated. For example, buckets 222, 223, and 224 are allocated and buckets 201–211 are free in the memory page illustrated in FIG. 2. If some or all of the buckets on a memory page are free, a pointer on the descriptor block points to a null terminated linked list identifying the free buckets in the memory page. In the example illustrated, the linked list of free buckets begins at bucket 201. Bucket 201 stores the location of the next bucket in the linked list. In this case, bucket 201 stores pointer 212 to bucket 202. Bucket 202, in turn, stores the location of the next bucket in the linked list. In this case, bucket 202 stores pointer 213 to bucket 203. Likewise, bucket 203 stores pointer 214 to bucket 204.

Similarly, bucket 204 stores pointer 215 to bucket 205. Bucket 205 stores pointer 216 to bucket 206. Bucket 206 stores pointer 217 to bucket 207. Bucket 207 stores pointer 218 to bucket 208. Bucket 208 stores pointer 219 to bucket 209. Bucket 209 stores pointer 220 to bucket 210. Bucket 210 stores pointer 221 to bucket 211. Bucket 211 stores information indicating that it is the end of the linked list and that no other buckets follow. If a bucket is not in the linked list for the memory page in which the bucket exists, it is understood to have been allocated As additional memory space is allocated within a page, the linked list is updated to reflect the changes in free buckets. For example, buckets may be allocated from the beginning, end, or middle (anywhere between the beginning and the end) of the linked list. In the preferred embodiment, buckets are allocated from the head of the linked list.

If buckets are allocated from the beginning of the linked list, the pointer in descriptor block 101 is updated to point to the new head of the linked list. If buckets are allocated from the end of the linked list, the linked list is truncated prior to the allocated buckets by storing an indication in the last free bucket that it is the end of the linked list and that no other buckets follow. If buckets are allocated from the middle of the linked list, the linked list is modified by storing a pointer in the last bucket prior to the allocated buckets that points to the next bucket following the allocated buckets.

As buckets are freed, the linked list is updated to reflect changes in free buckets. For example, freed buckets may be appended to the beginning, end, or middle (anywhere between the beginning and the end) of the linked list. In the preferred embodiment, freed buckets are added to the head of the linked list.

If freed buckets are appended to the beginning of the linked list, the pointer in descriptor block 101 is updated to point to the new head of the linked list. If buckets are appended to the end of the linked list, the linked list is modified by storing pointers in the bucket that was formerly the end of the linked list and in each additional freed bucket to be added to the linked list, each pointer pointing to the next free bucket to be included in the linked list. An indication is stored in the last free bucket to be added to the linked list that it is the end of the linked list and that no other buckets follow.

If freed buckets are appended to the middle of the linked list, the linked list is modified by storing a pointer in the last bucket prior to the allocated buckets that points to the first freed bucket to be added to the linked list. Each freed bucket to be added to the linked list stores a pointer pointing to the next freed bucket to be added to the linked list. The final freed bucket to be added to the linked list stores a pointer pointing to what was the next free bucket in the list before the additional freed buckets were added to the linked list.

When memory space on a memory page is allocated or freed, the memory allocator updates the linked list identifying free buckets, as described above. The memory allocator also updates counters stored in the descriptor block. The counters store information indicating how many buckets are allocated, how many buckets are free, and how much memory space is currently available as a contiguous segment.

If the counters store information that indicates how many buckets are allocated, the number of free buckets may be calculated by subtracting the number of allocated buckets from the total number of buckets. Thus, the number of free buckets may be determined without the need to store the number of free buckets.

Likewise, if the counters store information that indicates how many buckets are free, the number of allocated buckets may be calculated by subtracting the number of free buckets from the total number of buckets that are instantiated. Thus, the number of allocated buckets may be determined without the need to store the number of allocated buckets.

When memory allocation changes occur, the memory allocator counts the number of free buckets in the linked list for each memory page that has been affected by the change in memory allocation. The memory allocator preferably maintains a counter that stores the number of free buckets for each memory page and increments or decrements the counter when a change in memory allocation occurs. The memory allocator stores the updated information obtained from this count (e.g. the value held by the counter) in the descriptor block.

By storing the updated memory allocation information in the descriptor block, this embodiment of the present invention avoids the need to access each memory page and count every free or allocated bucket on each memory page every time a memory allocation operation is to be performed. Rather, this embodiment of the present invention allows the number of free buckets and the number of allocated buckets to be readily determined from the information burred in the descriptor block. Thus, memory allocation changes can be accomplished quickly and easily while accessing a minimal number of memory pages.

Figure 3:
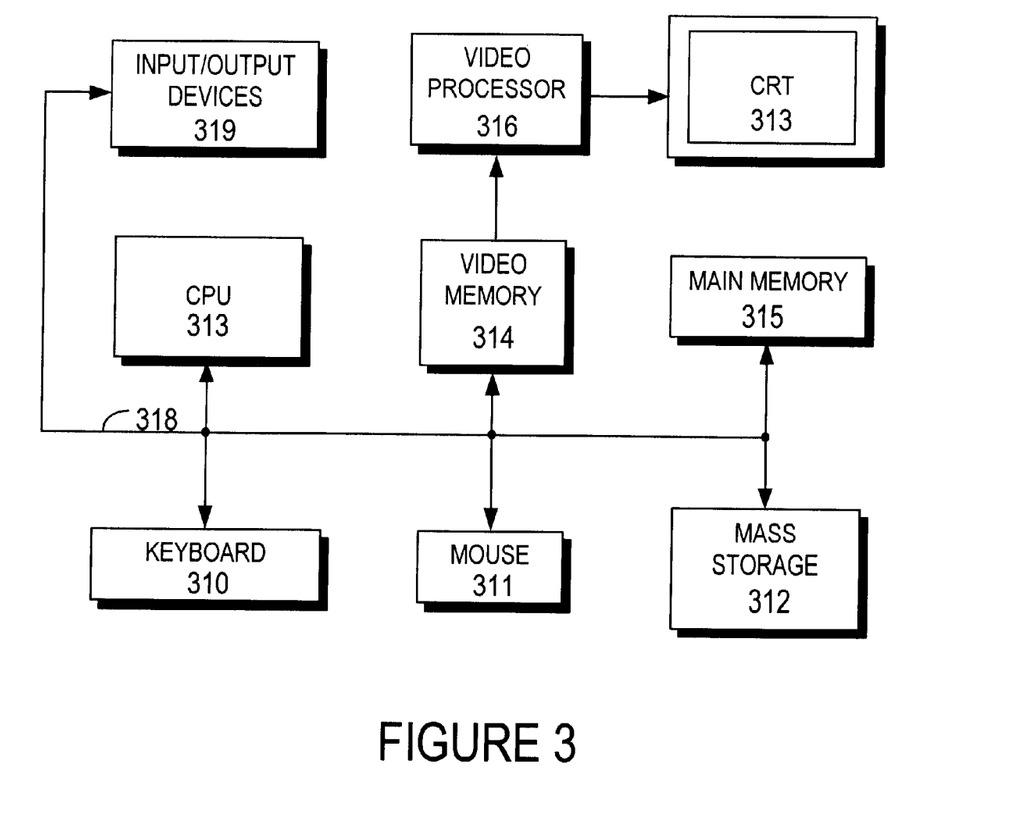
FIG. 3 is a block diagram illustrating a general purpose computer system.

FIG. 3 is a block diagram illustrating a general purpose computer system. The invention may be implemented on such a general purpose computer system. A keyboard 310 and mouse input device 311 are coupled to a bidirectional system bus 318. The keyboard and mouse input device are for introducing user input to the computer system and communicating that user input to a central processing unit (CPU) 313.

The computer system also includes video memory 314, main memory 315, mass storage 312, and input/output devices 319, all coupled to bidirectional system bus 318 along with keyboard 310, mouse input device 311 and CPU 313. Mass storage 312 may include both fixed and removable media, such as magnetic, optical or magnetic optical storage systems or any other available mass storage technology. Mass storage 312 may include readable and writable media systems and read-only media systems. Bidirectional system bus 318 may contain, for example, 32 address lines for addressing video memory 314 or main memory 315.

Bidirectional system bus 318 also includes, for example, a 32-bit data bus for transferring data between and among the components, such as CPU 313, main memory 315, video memory 314, mass storage 312, and input/output devices 319. Alternatively, multiplex data/address lines may be used instead of separate data and address lines.

Input/output devices 319 may include devices such as serial communication ports, parallel communication ports, modulator/demodulators (modems), network interfaces, printers, scanners, and other devices that transfer data from the computer system to external devices or that transfer data from external devices to the computer system.

In the preferred embodiment of this invention, the CPU 313 is a 32-bit microprocessor manufactured by Motorola, such as the 680×0 processor or a microprocessor manufactured by Intel, such as the 80×86, or Pentium processor. However, any other suitable microprocessor or microcomputer may be utilized.

Main memory 315 comprises dynamic random access memory (DRAM). Video memory 314 is a dual-ported video random access memory. One port of the video memory 314 is coupled to video processor 316. Video processor 316 is used to drive the cathode ray tube (CRT) raster monitor 317. Video processor 316 is well known in the art and may be implemented by any suitable means. This circuitry converts pixel data stored in video memory 314 to a raster signal suitable for use by monitor 317. Monitor 317 is a type of monitor suitable for displaying graphic images.

The computer system described above is for purposes of example only. The invention may be implemented in any type of computer system or programming or processing environment.

The invention provides not only information as to how much of the memory space arena is allocated and how much is free, but it provides information for each memory page in the memory space arena as to how much of the memory page is allocated and how much is free. Since accessing information stored on different memory pages is usually significantly less efficient than accessing information stored on the same memory page, the invention provides information that may be used to minimize the number of memory pages over which memory space allocated to a particular process is allocated. By reducing the number of memory pages on which information is stored, page switching may be minimized and efficiency maximized.

Furthermore, processes that allocate large amounts of memory space, but then free much of it often result in much memory fragmentation. Memory fragmentation occurs when memory available for allocation to a process does not exist in a contiguous block, but is spread widely throughout many pages throughout the memory space arena. By allowing the memory allocation and deallocation behavior of a process to be identified, the invention allows the memory allocator to modify the method by which it allocates and frees memory space for that process so as to minimize fragmentation and maximize efficiency.

Figure 4:
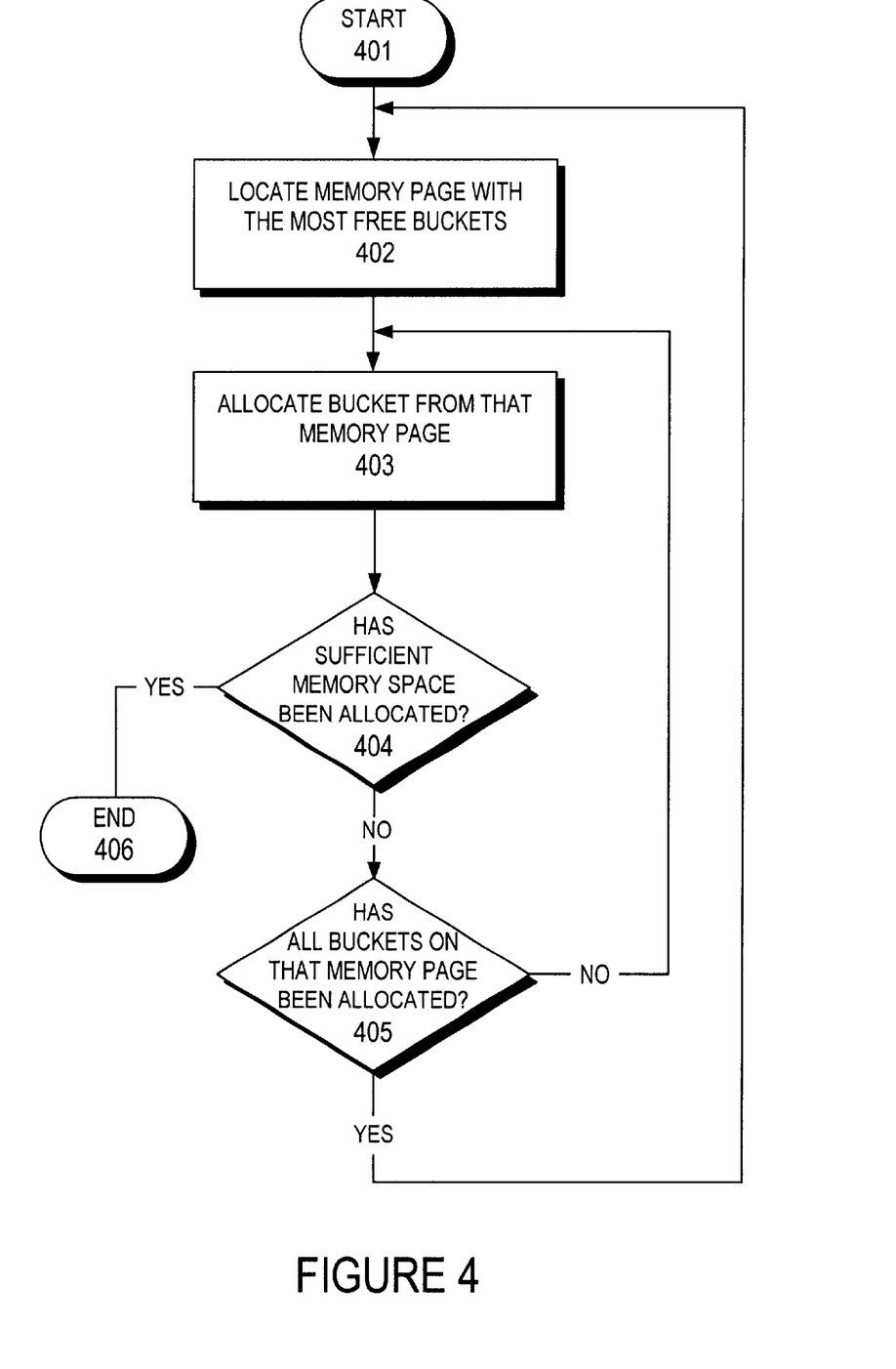
FIG. 4 is a flow diagram illustrating one embodiment of the invention that minimizes fragmentation when allocating memory space to a process.

FIG. 4 is a flow diagram illustrating one embodiment of the invention that minimizes fragmentation when allocating memory space to a process. In step 401, the method begins and continues to step 402. In step 402, the method locates the memory page having the optimum number of free buckets of the desired bucket size. This determination is made by accessing the count information stored in the descriptor block for each memory page. In step 403, the method allocates a bucket from that memory page.

In step 404, the method checks whether sufficient memory space has been allocated to the process. If sufficient memory space has been allocated, the method ends in step 406. If sufficient memory space has not been allocated, the method continues in step 405. In step 405, the method checks whether all buckets on the selected memory page have been allocated. If not, the method returns to step 403 and allocates another bucket from the same memory page.

Preferably, step 402 identified a single memory page that can be used to satisfy the memory request. Allocating memory within a page boundary reduces the potential for paging (i.e., swapping memory pages into and out of memory). However, it may be necessary to allocate memory across page boundaries. If all of the buckets on the selected memory page have already been allocated, the method returns to step 402, where the memory page having an optimum (e.g., highest) number of free buckets is identified among the remaining memory pages and selected to be used for memory allocation.

Since the method begins allocating memory space from the memory page that has the most free buckets, the method increases the likelihood that the needed memory space will be allocated within a single memory page, or at least within the fewest possible number of memory pages.

Thus, a method and apparatus for allocating memory and for providing information relating to memory allocation has been described in conjunction with one or more specific embodiments. The invention is defined by the claims and their full scope of equivalents.

We claim:

1. In a computer system, a method to non-invasively identify memory allocation information by a process external to a memory allocator for a currently running process, said method comprising:

reserving a memory space arena comprising a descriptor block and a plurality of memory blocks from which memory is allocated for a process running in said memory space arena;

storing a data structure identifier inside said descriptor block, said descriptor block comprising memory allocation information for said process running in said memory space arena.

2. The method of claim 1 wherein said memory allocation, information comprises:

a first value representative of a quantity of memory pages having a first bucket size, said memory pages instantiated in said memory space arena;

a second value representative of a quantity of buckets allocated in one of said memory pages; and a first pointer to a first linked list identifying unallocated buckets in said memory pages.

3. The method of claim 2 further comprising the step of:

modifying said memory allocation information when a change in memory allocation occurs.

4. The method of claim 3 wherein said step of storing said memory allocation information further comprises:

storing a third value representative of a quantity of buckets allocated in a second memory page instantiated in said memory space arena; and storing a second pointer to a second linked list identifying unallocated buckets in said second memory page.

5. The method of claim 4 wherein said step of storing said memory allocation information further comprises:

storing a fourth value representative of a quantity of pages having a second bucket size, said pages instantiated in said memory space arena;

storing a fifth value representative of a quantity of buckets allocated in one of said memory pages having a second bucket size; and storing a third pointer to a third linked list identifying unallocated buckets in said memory pages having said second bucket size.

6. The method of claim 5 wherein said step of reserving a memory space arena comprises reserving said memory space arena exclusive of use by other processes.

7. An article of manufacture comprising:

a computer usable medium having a computer readable program code embodied therein for causing a process to non-invasively identify memory allocation information for a currently running process, said computer readable program code in said article of manufacture comprising:

computer readable program code configured to cause said computer to reserve a memory space arena comprising a plurality of memory blocks from which memory for said currently running process is allocated;

computer readable program code configured to cause said computer to define a data structure in said memory space arena to store said memory allocation information;

computer readable program code configured to cause said computer to identify said data structure by storing a data structure identifier in said data structure that allows a process to locate said memory space arena; and computer readable program code configured to cause said computer to store said memory allocation information, said memory allocation information comprising:

a first representative of a quantity of pages having a first bucket size, said pages instantiated in said memory space arena;

a second value representative of a quantity of buckets allocated in one of said quantity of pages having said first bucket size instantiated in said memory space arena; and a pointer to a linked list of identifying unallocated buckets in said one of said quantity of pages having said first bucket size instantiated in said memory space arena.

8. The article of manufacture of claim 7 wherein said computer readable program code in said article of manufacture further comprises:

computer readable program code configured to cause said computer to modify said memory allocation information when a change in memory allocation occurs.

9. A program storage device readable by a machine, tangibly embodying a program of instructions executable by said machine to perform a method for a process to non-invasively identify memory allocation information for a currently running process, said method comprising:

reserving a memory space arena comprising a plurality of memory blocks from which memory is allocated to said currently running process;

defining a data structure in said memory space arena to store said memory allocation information;

identifying said data structure by storing a data structure identifier in said data structure that allows a process to locate said memory allocation information comprising:

a first value representative of a quantity of pages having a first bucket size, said pages instantiated in said memory space arena;

a second value representative of a quantity of buckets allocated in one of said quantity of pages having a first bucket size instantiated in said memory space arena; and a pointer to a linked list identifying unallocated buckets in said one of said quantity of pages having said first bucket size instantiated in said memory space arena.

10. The program storage device of claim 9 wherein said method steps further comprise the step of:

modifying said memory allocation information when a change in memory allocation occurs.

11. An apparatus for non-invasively identifying memory allocation information for a currently running process comprising:

a computer system comprising a processor and memory, wherein a portion of said memory is reserved as a memory space arena, said memory space arena comprising a descriptor block and plurality of memory blocks having a quantity of pages from which memory is allocated to a currently running process, said descriptor block comprising:

a first memory location storing a value representative of a quantity of pages having a first bucket size instantiated in said memory space arena;

a second memory location storing a second value representative of a quantity of buckets allocated in one of said quantity of pages having said first bucket size instantiated in said memory space arena;

a third memory location storing a pointer to a linked list identifying unallocated buckets in said one of said quantity of pages having said first bucket size instantiated in said memory space arena; and an identifier memory location storing a data structure identifier.

* * * * *